United States Patent
Joo et al.

(10) Patent No.: US 8,542,791 B2
(45) Date of Patent: Sep. 24, 2013

(54) REFUELING APPARATUS FOR SODIUM-COOLED FAST REACTOR AND METHOD FOR THE SAME

(75) Inventors: Young-Sang Joo, Daejeon (KR); Chang-Gyu Park, Daejeon (KR); Seok-Hoon Kim, Daejeon (KR); Gyeong-Hoi Koo, Daejeon (KR); Jae-Han Lee, Daejeon (KR)

(73) Assignees: Korea Atomic Energy Research Institute, Yuseong-gu, Daejeon (KR); Korea Hydro & Nuclear Power Co., Ltd., Gangnam-gu, Seoul (KR)

( * ) Notice: Subject to any disclaimer, the term of this patent is extended or adjusted under 35 U.S.C. 154(b) by 1351 days.

(21) Appl. No.: 12/291,681

(22) Filed: Nov. 12, 2008

(65) Prior Publication Data
US 2009/0129527 A1 May 21, 2009

(30) Foreign Application Priority Data
Nov. 19, 2007 (KR) .................. 10-2007-0118137

(51) Int. Cl.
*G21C 19/10* (2006.01)
*G21C 19/12* (2006.01)
*G21C 19/18* (2006.01)

(52) U.S. Cl.
USPC .......................................... 376/268; 376/270

(58) Field of Classification Search
USPC ................. 376/260, 264, 265, 267, 268, 269, 376/270, 271
See application file for complete search history.

(56) References Cited

U.S. PATENT DOCUMENTS

| 4,886,068 | A | * | 12/1989 | Kaneko et al. | 600/437 |
| 5,294,861 | A | * | 3/1994 | Nattermann | 310/334 |
| 6,230,568 | B1 | * | 5/2001 | Winston et al. | 73/601 |
| 6,568,270 | B2 | * | 5/2003 | Hongerholt | 73/596 |

FOREIGN PATENT DOCUMENTS

| JP | 62-238406 | | 10/1987 |
| JP | 62238406 | A * | 10/1987 |
| JP | 02-129596 | | 5/1990 |
| JP | 02129596 | A * | 5/1990 |
| JP | 02-304398 | | 12/1990 |
| JP | 02304398 | A * | 12/1990 |
| JP | 03-082954 | | 4/1991 |
| JP | 03082954 | A * | 4/1991 |

OTHER PUBLICATIONS

Piwakowski et al.; "Generation of Rayleigh waves into mortar and concrete samples", 2004, Ultrasonics, 42, pp. 395-402.*

* cited by examiner

*Primary Examiner* — Jack W Keith
*Assistant Examiner* — Sean P Burke
(74) *Attorney, Agent, or Firm* — Collard & Roe, P.C.

(57) ABSTRACT

A refueling apparatus for charging nuclear fuel in a reactor vessel, the refueling apparatus including: a refueling unit loading new nuclear fuel to a core or extracting spent nuclear fuel from the core; and a waveguide sensor unit including an ultrasonic wedge to form a Lamb wave, a waveguide with an end connected to the ultrasonic wedge and with another end transmitting the Lamb wave into the reactor vessel, and an ultrasonic sensor connected to the ultrasonic wedge and sensing a reflection signal reflected from an inside of the reactor vessel, the waveguide being formed in a plate shape and mounted in an end of the refueling unit. The waveguide integrally moves with the refueling unit, and the waveguide sensor unit detects a condition of the inside of the reactor vessel, while the refueling unit refuels the fuel assembly in the reactor vessel.

8 Claims, 9 Drawing Sheets

124(134)

REFUELING APPARATUS FOR SODIUM-COOLED FAST REACTOR AND METHOD FOR THE SAME

CROSS-REFERENCE TO RELATED APPLICATION

This application claims the benefit of Korean Patent Application No. 10-2007-0118137, filed on Nov. 19, 2007, in the Korean Intellectual Property Office, the disclosure of which is incorporated herein by reference.

BACKGROUND OF THE INVENTION

1. Field of the Invention

The present invention relates to a refueling apparatus and method, and more particularly, to a refueling apparatus and method that may simultaneously detect a condition of reactor core in reactor vessel and a fuel assembly in the reactor vessel.

2. Description of Related Art

In a liquid metal fast reactor such as a sodium-cooled fast reactor, refueling is performed by remote control in a closed fuel cycle. Since sodium is opaque and reactive with air, refueling may be performed while a cover of a reactor vessel is not open.

In a conventional art, an ultrasonograph is mounted in a reactor, and a refueling apparatus is transferred to a predetermined location of a core after detecting an obstacle on a core top. Accordingly, fuel assemblies are exchanged. An ultrasonic immersion sensor is generally used for testing upper portion of a reactor core top. Also, an immersion ultrasonic sensor may directly immerse an ultrasonic sensor into sodium for an ultrasonic examination.

However, a fuel assembly in a core may be deflected or may be extended by several mm due to high temperature and radiation. In a conventional art, since fuel assemblies are exchanged without information about the above-described location movement or deflection, safe handling of a fuel assembly may be compromised.

Also, in a conventional art, an immersion ultrasonic sensor and a scanner to operate the immersion ultrasonic sensor must be separately mounted in a nuclear reactor. The scanner is required to be removed after examination. Accordingly, an examination process is complex and a significant amount of time for examination is spent.

Also, an immersion ultrasonic sensor is contact with a high temperature, highly radioactive liquid metal. Thus, a life of an immersion ultrasonic sensor may be reduced.

BRIEF SUMMARY

An aspect of the present invention provides a refueling apparatus and method which may exchange a fuel assembly while detecting a condition of an inside of a reactor vessel.

Another aspect of the present invention also provides a refueling apparatus and method which may detect a location movement and deflection of a fuel assembly while refueling, and thereby may improve safe handling of the fuel assembly.

Another aspect of the present invention also provides a refueling apparatus and method which is integrally formed with an ultrasonic examination apparatus, and thereby may simplify a refueling process and an in-vessel component in a reactor vessel.

According to an aspect of the present invention, there is provided a refueling apparatus for charging nuclear fuel in a reactor vessel, the refueling apparatus including: a refueling unit loading new nuclear fuel to a core or extracting spent nuclear fuel from the reactor core; and a waveguide sensor unit including an ultrasonic wedge to form a Lamb wave, a waveguide with an end connected to the ultrasonic wedge and with another end transmitting the Lamb wave into liquid metal in the reactor vessel, and an ultrasonic sensor connected to the ultrasonic wedge and sensing a reflection signal reflected from the fuel assembly of the reactor core in the reactor vessel, the waveguide being formed in a plate shape and mounted in an end of the refueling unit. In this instance, the waveguide integrally moves with the refueling unit, and the waveguide sensor unit detects a condition of the fuel assembly of the reactor core in the reactor vessel, while the refueling unit refuels the reactor vessel.

The refueling apparatus is for exchanging nuclear fuels in the reactor vessel. The reactor vessel may be a reactor vessel used for a liquid metal reactor, heavy liquid metal reactor, and the like. However, the reactor vessel is not limited to the above-described reactors, and the reactor vessel may include any reactor vessel capable of refueling using the refueling apparatus according to the present invention. Hereinafter, a liquid metal reactor using a liquid metal such as sodium as a coolant is described as an example.

When new nuclear fuel is loaded to the core, or spent fuel is extracted from the core, an extraction unit of the refueling unit is required to move to a location of a fuel assembly. In general, the movement may be performed by controlling a rotatable plug and the refueling unit. The rotatable plug may be divided into a double rotation, and the like based on a rotation type.

The refueling unit determines the location of the fuel assembly as described above, extracts the nuclear fuel, and thereby may transfer the nuclear fuel to a predetermined location. Accordingly, the refueling unit may load the new nuclear fuel to the core or extract the spent nuclear fuel from the core.

The refueling unit may include the extraction unit extracting the nuclear fuel and a central axis connected to the extraction unit. The central axis transfers the extraction unit. However, a configuration and location determination method of the refueling unit may not be limited to the above-described embodiments.

The refueling apparatus includes the waveguide sensor unit, and thereby may refuel the reactor core in the reactor vessel while detecting the condition of reactor core in the reactor vessel through a direction of the refueling unit. Also, the refueling apparatus includes the refueling unit and the waveguide sensor unit which is integrally formed with the refueling unit, and thereby may simplify in-vessel components in the reactor vessel. Also, the refueling apparatus may detect the condition of the inside of the reactor vessel such as the location of the fuel assembly and whether an obstacle exists on a transfer path of nuclear fuel assembly using the ultrasonic signal. Accordingly, a safe handling of the fuel assembly may be improved.

The waveguide sensor unit may detect the condition of the inside of the reactor vessel as follows.

When an ultrasonic signal with a particular frequency (f) is transmitted to the waveguide through the ultrasonic wedge, the ultrasonic signal may be converted into a Lamb wave mode, that is, a plate wave mode. The waveguide is formed in a plate shape. The Lamb wave is transmitted in a lengthwise direction of the waveguide through the waveguide, and may be emitted from the other end of the waveguide to the reactor core in the reactor vessel. In this instance, the Lamb wave may be converted into a longitudinal wave mode in a liquid metal and the longitudinal wave is propagated. A signal reflected from an object in the reactor vessel is received in the waveguide and converted into the Lamb wave again. The ultrasonic signal may be detected by the ultrasonic sensor, and the detected reflection signal is analyzed. Accordingly, the condition of the inside of the reactor vessel can be detected.

A leaky ultrasonic beam may be emitted from the other end of the waveguide to the inside of the reactor vessel. In this instance, a radiation angle (θ) of the leaky ultrasonic beam may be determined by a longitudinal wave velocity ($V_L$) of sodium and a phase velocity ($C_P$) of the Lamb wave. That is, the radiation angle (θ) may be determined by, $$\sin\theta(fd) = \frac{V_L}{C_P(fd)}$$

The phase velocity ($C_P$) may be represented as a function of the frequency (f) of an ultrasonic wave and a thickness (d) of the waveguide. Accordingly, the radiation angle (θ) of the leaky ultrasonic beam may be represented as the function of the frequency (f) of the ultrasonic wave and the thickness (d) of the waveguide. Thus, when the frequency (f) of the ultrasonic wave or the thickness (d) of the waveguide changes, the radiation angle (θ) of the leaky ultrasonic beam may change.

Accordingly, a scan area detected by the waveguide sensor unit may increase without a mechanical operation.

When the frequency (f) of the ultrasonic wave incident to the ultrasonic wedge changes, the phase velocity ($C_P$) may change, and thus a radiation angle of a radiation beam, emitted from the waveguide, may change. Accordingly, the scan area detected by the waveguide sensor may increase without a mechanical operation. Also, when a thickness of the other end of the waveguide increases in a lengthwise direction, the phase velocity ($C_P$) increases and the radiation angle of the radiation beam may decrease. Accordingly, an emitted leaky ultrasonic beam may converge. Because the beam width of the leaky ultrasonic wave is reduced, a C-Scan image resolution may be improved.

However, a dispersion property of the Lamb wave is required for the improvement. The phase velocity ($C_P$) of the Lamb wave changes depending on a thickness of the waveguide and an incident frequency. A dispersion property of $0_{th}$ antisymmetric Lamb wave ($A_0$) is clearly shown in an range under 3 MHz·mm which is a value obtained by multiplying the incident frequency and the thickness of the waveguide. Accordingly, a phase velocity of the $0_{th}$ antisymmetric Lamb wave ($A_0$) may significantly change in the range depending on the value obtained by multiplying the incident frequency and the thickness of the waveguide.

Accordingly, the value obtained by multiplying the incident frequency of the Lamb wave and the thickness of the waveguide is preferably under 3 MHz·mm, specifically, about 0.5 MHz·mm to 2.5 MHz·mm. For this, a longitudinal wave velocity of the ultrasonic wedge is preferably about 1300 m/s to 2000 m/s. Thus, the $0_{th}$ antisymmetric Lamb wave ($A_0$) of an range of 0.5 MHz·mm to 2.5 MHz·mm is generated. For this, the ultrasonic wedge may be made of a solid Teflon® wedge, and the ultrasonic wedge may be filled with water or glycerin.

Also, the refueling unit may have a space for the waveguide, and at least a portion of the waveguide is mounted in the space. That is, at least the portion of the waveguide may be mounted in the refueling unit.

According to another aspect of the present invention, there is provided a refueling apparatus for charging nuclear fuel in a reactor vessel, the refueling apparatus including: a refueling unit including an extraction unit extracting the nuclear fuel and a central axis connected to the extraction unit and transferring the extraction unit; a first waveguide sensor unit including a first ultrasonic wedge to form a Lamb wave, a first waveguide with an end connected to the first ultrasonic wedge and with another end transmitting the Lamb wave to a bottom of the extraction unit, and a first ultrasonic sensor connected to the first ultrasonic wedge and sensing a reflection signal reflected from an inside of the reactor vessel, the first waveguide being formed in a plate shape and mounted in an end of the extraction unit; and a second waveguide sensor unit including a second ultrasonic wedge to form a Lamb wave, a second waveguide with an end connected to the second ultrasonic wedge and with another end transmitting the Lamb wave to a side of the central axis, and a second ultrasonic sensor connected to the second ultrasonic wedge and sensing a reflection signal reflected from an inside of the reactor vessel, the second waveguide being formed in a plate shape and mounted in an end of the central axis.

In this instance, the first waveguide sensor unit of the refueling apparatus may detect a condition of a bottom of the extraction unit, and the second waveguide sensor unit may detect a condition of a side of the central axis, while the refueling unit refuels the reactor vessel.

The extraction unit may have a first space for the first waveguide, and at least a portion of the first waveguide may be mounted in the extraction unit, and the extraction unit may have a second space for the second waveguide, and at least a portion of the second waveguide may be mounted in the central axis.

According to still another aspect of the present invention, there is provided a refueling method for charging nuclear fuel in a reactor vessel, the refueling method including: generating an ultrasonic signal; transmitting the ultrasonic signal to an ultrasonic wedge and forming a Lamb wave; transmitting the Lamb wave into the reactor vessel from another end of a waveguide, the waveguide with an end connected to the ultrasonic wedge and being formed in a plate shape; sensing a reflection signal reflected from an inside of the reactor vessel through an ultrasonic sensor connected to the ultrasonic wedge; detecting a condition of the inside of the reactor vessel using the reflection signal; and refueling the reactor vessel through a refueling unit loading new nuclear fuel to a core or extracting spent nuclear fuel from the core.

In this instance, the waveguide integrally moves with the refueling unit, and the condition of the inside of the reactor vessel is detected, while the refueling unit refuels the fuel assembly of the reactor core.

Also, in the radiating, a radiation angle of a radiation beam may be changed depending on a frequency change of the ultrasonic signal incident to the ultrasonic wedge. The radiation beam is radiated from the other end of the waveguide. Also, the ultrasonic wedge may be made of a material with a longitudinal wave velocity of about 1300 m/s to 2000 m/s, and generate an $A_0$ antisymmetric Lamb wave of an range 0.5 MHz·mm to 2.5 MHz·mm which is a value obtained by multiplying an incident frequency of the Lamb wave and a thickness of the waveguide.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF EMBODIMENTS

Figure 1:
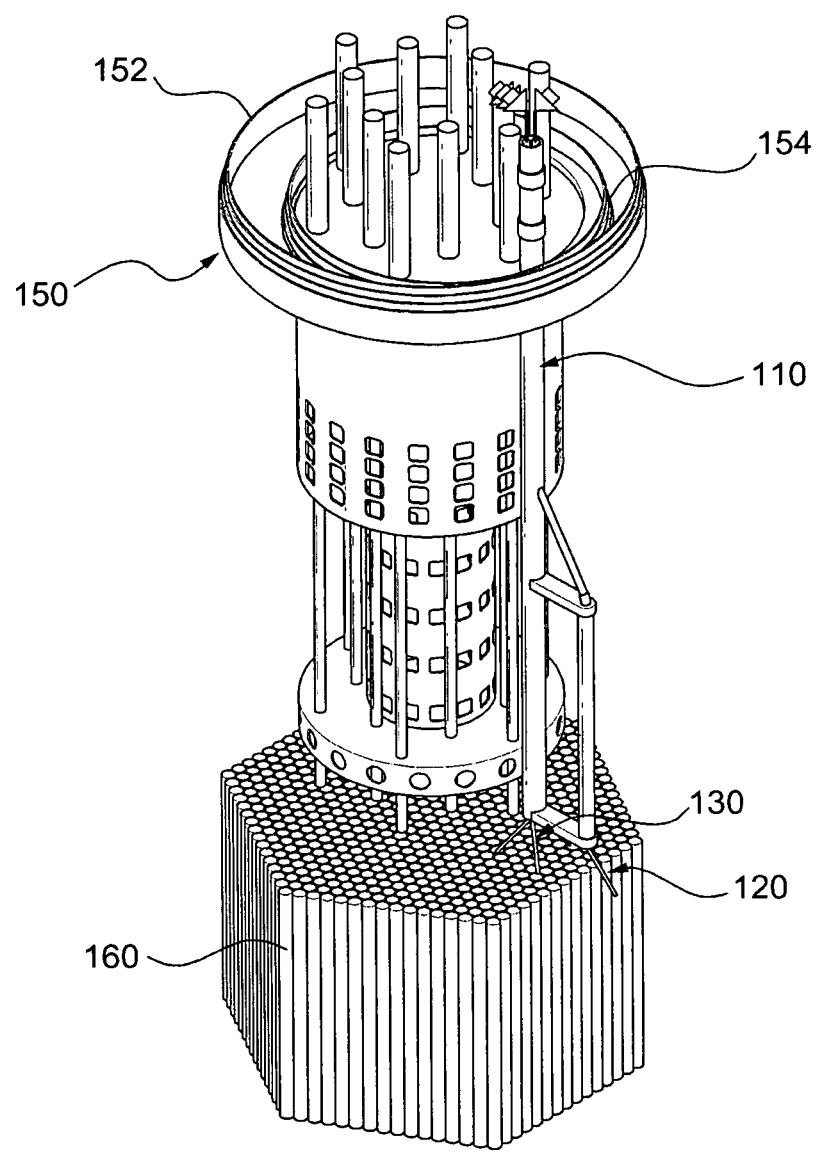
FIG. 1 is a perspective view illustrating an internal configuration of a reactor vessel equipped with a refueling apparatus according to an exemplary embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 2:
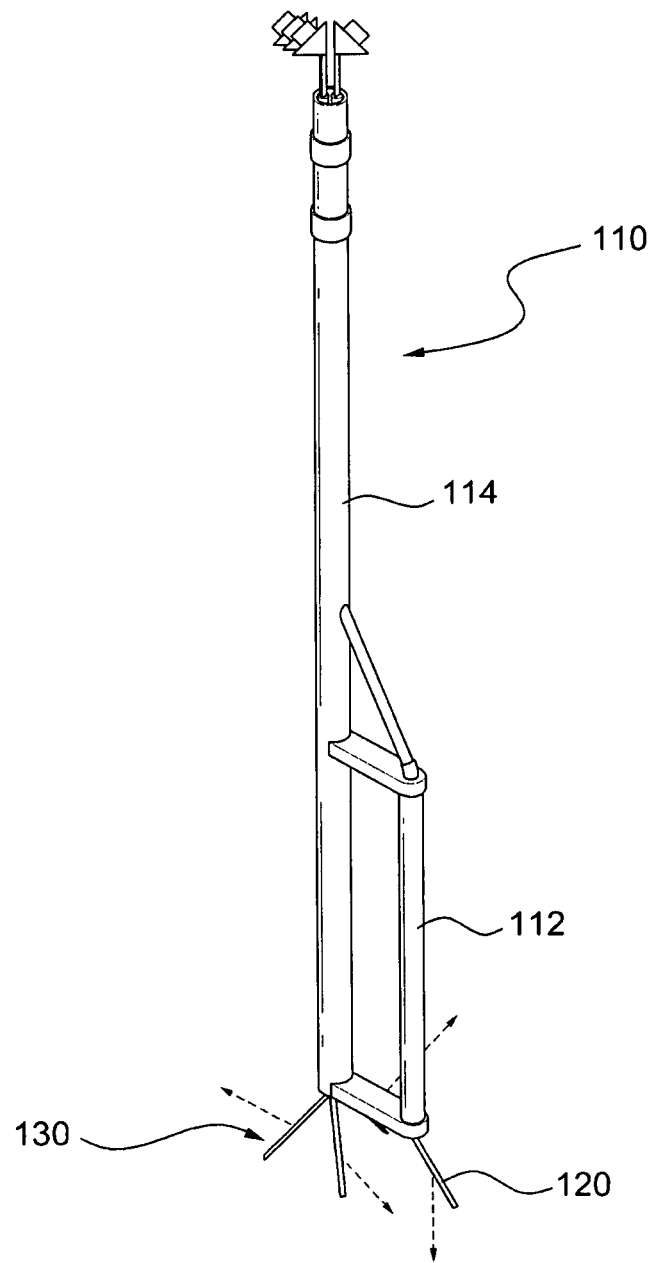
FIG. 2 is a perspective view illustrating a refueling unit, first and second waveguide sensor units of FIG. 1.
Figure 3:
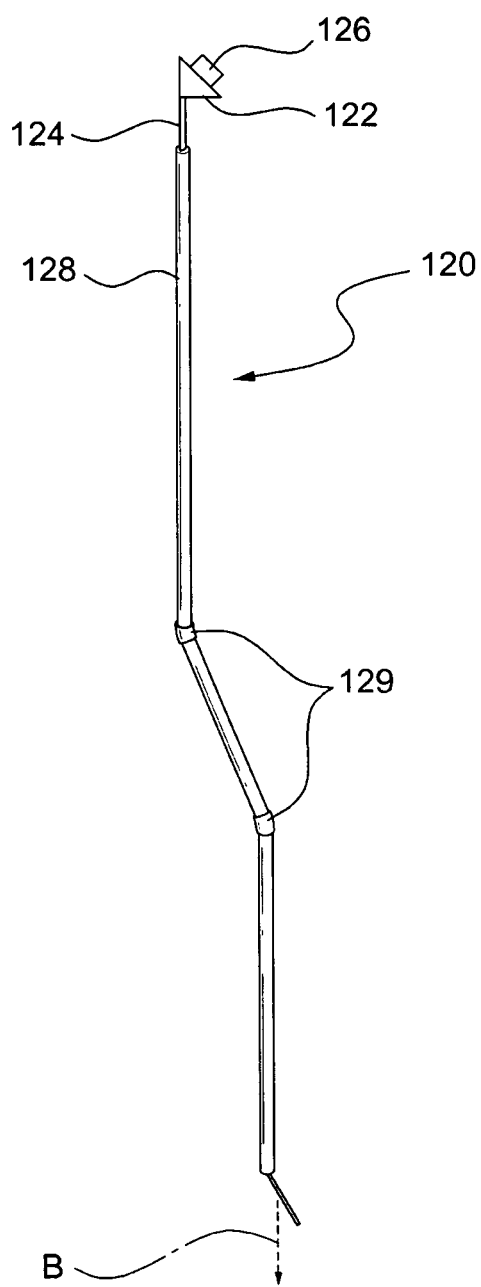
FIG. 3 is a perspective view illustrating a first waveguide sensor unit.
Figure 4:
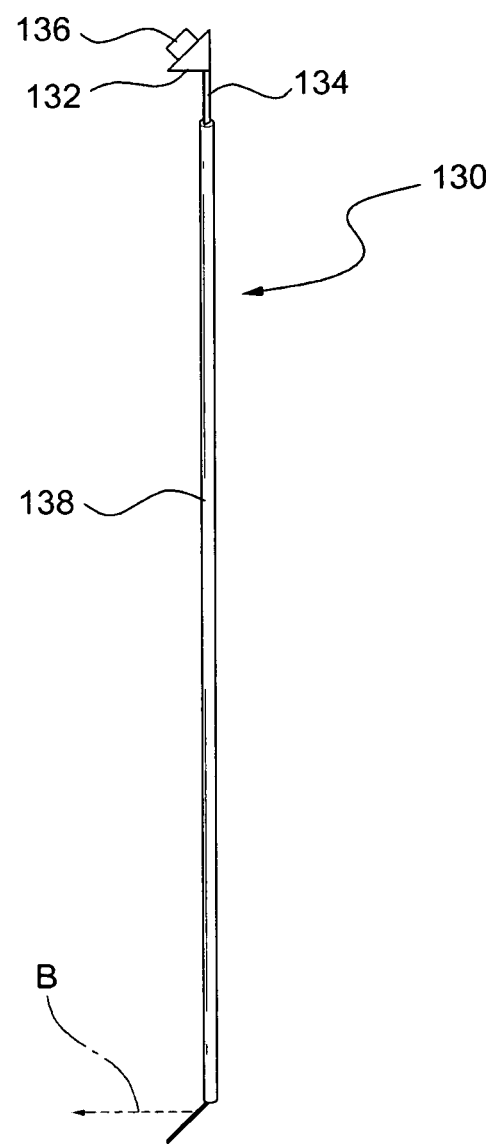
FIG. 4 is a perspective view illustrating a second waveguide sensor unit.

FIG. 1 is a perspective view illustrating an internal configuration of a reactor vessel equipped with a refueling apparatus according to an exemplary embodiment of the present invention. FIG. 2 is a perspective view illustrating a refueling unit, first and second waveguide sensor units of FIG. 1. FIG. 3 is a perspective view illustrating a first waveguide sensor unit. FIG. 4 is a perspective view illustrating a second waveguide sensor unit.

As illustrated in FIG. 1, the refueling apparatus according to an embodiment of the present invention may include a refueling unit 110, first waveguide sensor unit 120, and second waveguide sensor unit 130.

The refueling apparatus is for refueling a fuel assembly of a reactor core in the reactor vessel for a liquid metal reactor, heavy liquid metal reactor, and the like. Hereinafter, a liquid metal reactor using a liquid metal such as sodium as a coolant is described as an example.

The refueling unit 110 loads new nuclear fuel to a core 160 or extracts spent nuclear fuel from the core 160. The refueling unit 110 includes an extraction unit 112 and a central axis 114. The extraction unit 112 extracts the nuclear fuel. The central axis 114 is connected to the extraction unit 112 and transfers the extraction unit 112. In general, the nuclear fuel is loaded to and extracted from the core 160 in a form of a fuel assembly.

When the new nuclear fuel is required to be loaded to the core 160, or the spent nuclear fuel is required to be extracted from the core 160, the extraction unit 112 of the refueling unit 110 is to move to a location of the fuel assembly. The movement may be performed by a rotatable plug 150 and the refueling unit 110.

The rotatable plug may be divided into a double rotation, and the like based on a rotation type. In a double rotation plug, the rotatable plug 150 on a top of the reactor vessel includes a large rotatable plug 152 and a small rotatable plug 154. Also, a rotation axis is erratic. Accordingly, the refueling unit 110 mounted on the small rotatable plug 154 may be moved to a particular location of the core 160. According to an embodiment of the present invention, the double rotation plug scheme is used as an example.

The central axis 114 may move to a particular location depending on a rotation of the double rotation plug 150. Accordingly, the extraction unit 112 connected to the central axis 114 may accurately move to the location of the fuel assembly. The fuel assembly, extracted by the extraction unit 112 after the movement, may again move to a predetermined location, again due to the rotation of the double rotation plug 150. Through the use of the extraction unit 112, the refueling unit 110 may load the new nuclear fuel to the core 160 or extract the spent nuclear fuel from the core 160.

The first waveguide sensor unit 120 may detect a condition of the extraction unit 112, for example, whether the extraction unit 112 is located exactly on top of the fuel assembly or whether the fuel assembly is appropriately extracted by the extraction unit 112. As illustrated in FIG. 3, the first waveguide sensor unit 120 includes a first ultrasonic wedge 122, first waveguide 124, and first ultrasonic sensor 126.

An ultrasonic signal generated externally may be transmitted to the first waveguide 124 through the first ultrasonic wedge 122. The first waveguide 124 is formed in a plate shape. When an ultrasonic signal with a particular frequency is transmitted to the first waveguide 124 through the first ultrasonic wedge 122, the ultrasonic signal may be converted into a Lamb wave mode.

The Lamb wave, that is, a plate wave, propagates in a solid plate. The Lamb wave may be divided into a symmetrical mode (S-mode) and an antisymmetrical mode (A-mode). In the S-mode, an element of the Lamb wave vibrating in a direction of the Lamb wave is symmetrical based on a center of a plate thickness. In the A-mode, the element is ant-symmetrical. The first waveguide sensor unit 120 according to an embodiment of the present invention may use a $0_{th}$ antisymmetric Lamb wave ($A_0$) from among a variety of Lamb waves, which is described in detail.

The generated Lamb wave may be propagated along the first waveguide 124 in a lengthwise direction of the first waveguide 124. A thickness of the first waveguide 124 may be about 1 mm to 2 mm, and a length of the first waveguide 124 may be several meters. That is, the first waveguide 124 may be a long thin stainless steel plate. An end of the first waveguide 124 may be connected to the first ultrasonic wedge 122 located outside of the reactor vessel. Another end of the first waveguide 124 may be located inside of the reactor vessel.

A first space for the first waveguide 124 exists in the extraction unit 112. At least a portion of the first waveguide 124 may be received in the first space. Accordingly, the portion of the first waveguide 124 may be mounted in the extraction unit 112, as illustrated in FIG. 2. A portion of the first waveguide 124 excluding the portion may be mounted in a second space of the central axis 114, which is described below. For the configuration, a bent waveguide may be used as illustrated in FIG. 3. However, a location of the first waveguide 124 is not limited. That is, the first waveguide 124 is not limited to be mounted in the extraction unit 112 and may be located anywhere extraction of the fuel assembly or detection of the extraction unit 112 is possible.

A first waveguide protection tube 128 may additionally envelope the first waveguide 124. The first waveguide protection tube 128 protects the first waveguide 124 from a high-temperature, highly radioactive liquid metal. The first waveguide protection tube 128 may be spaced apart from a surface of the first waveguide 124 by a predetermined distance to prevent propagation energy of the Lamb wave from being leaked into the liquid metal. Also, as illustrated in FIG. 3, the first waveguide protection tube 128 may be bent using a protection tube bending unit 129 to be matched with a shape of the first waveguide 124.

According to an embodiment of the present invention, the refueling apparatus may generate an ultrasonic signal externally from the reactor vessel, and emit the ultrasonic signal into the reactor vessel. Accordingly, the first ultrasonic sensor 126 may be mounted outside the reactor vessel, and the refueling apparatus may remotely transmit the ultrasonic signal into the reactor vessel using the first waveguide 124. Since the first ultrasonic sensor 126 is located outside of the reactor vessel, the first ultrasonic sensor 126 may be prevented from contacting with the high-temperature, highly radioactive liquid metal. Accordingly, a life of the first ultrasonic sensor 126 may be extended.

Also, the Lamb wave emitted to the liquid metal in the reactor vessel may be converted into a longitudinal wave mode, and propagated. A reflection signal reflected from an object in the reactor vessel is converted into the Lamb wave again, and received in the first waveguide 124. The reflection signal may be detected by the first ultrasonic sensor 126 connected to the first waveguide 124.

The second waveguide sensor unit 130 may detect a condition of an upper portion of the reactor core 160 top. For example, the second waveguide sensor unit 130 may detect whether an obstacle exists on a transfer path of nuclear fuel. As illustrated in FIG. 4, the second waveguide sensor unit 130 may include a second ultrasonic wedge 132, second waveguide 134, and second ultrasonic sensor 136. Also, the second waveguide sensor unit 130 may further include a second waveguide protection tube 138 protecting the second waveguide 134. The second ultrasonic wedge 132, second waveguide 134, second ultrasonic sensor 136, and second waveguide protection tube 138 function as the above-described first ultrasonic wedge 122, first waveguide 124, first ultrasonic sensor 126, and first waveguide protection tube 128, respectively.

According to an embodiment of the present invention, a second space for the second waveguide 134 exists in the central axis 114. At least a portion of the second waveguide 134 may be received in the second space. Accordingly, the portion of the second waveguide 134 may be mounted in the central axis 114, as illustrated in FIG. 2. However, a location of the second waveguide 134 is not limited. That is, the second waveguide 134 is not limited to be mounted in the central axis 114 and may be located anywhere transfer of the fuel assembly or detection of the central axis 114 is possible. Also, the second waveguide 134 and at least a portion of the first waveguide 124 may be received in the second space.

Also, a plurality of second waveguide sensor units 130 may be included in the refueling apparatus. The side of the central axis 114 may be detected by the second waveguide sensor units 130, and a range of the detection may be limited based on a location of the second waveguide 134. Accordingly, a plurality of second waveguides 134 corresponding to a direction of the refueling unit 110 is included, and thus the range of the detection of the second waveguide sensor units 130 may not be limited.

Figure 5:
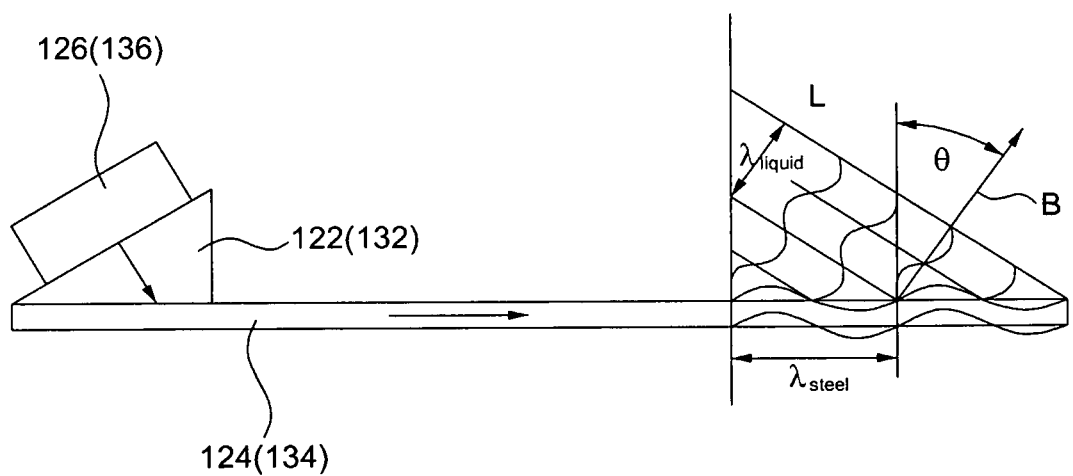
FIG. 5 is a conceptual diagram illustrating a radiation beam radiated from another end of a waveguide with an end connected to an ultrasonic wedge.
Figure 6:
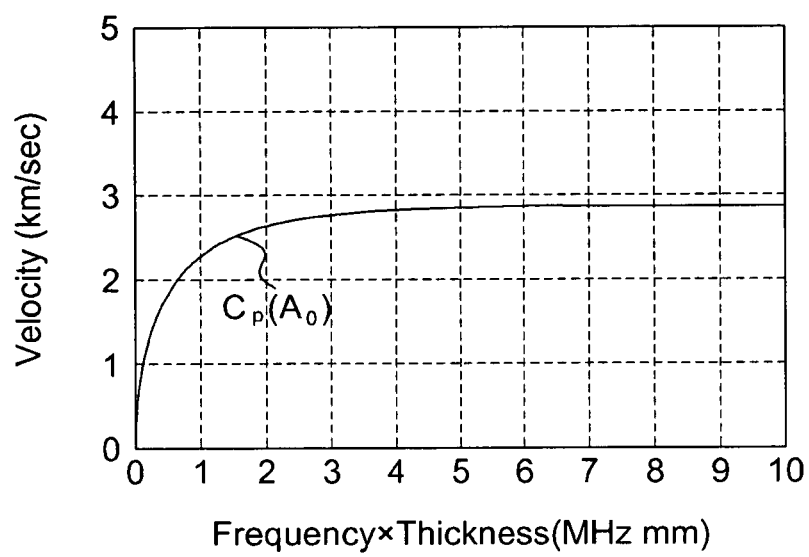
FIG. 6 is a graph illustrating a dispersion property of phase velocity of a Lamb wave depending on a value obtained by multiplying a frequency of the Lamb wave and a thickness of a waveguide.
Figure 7:
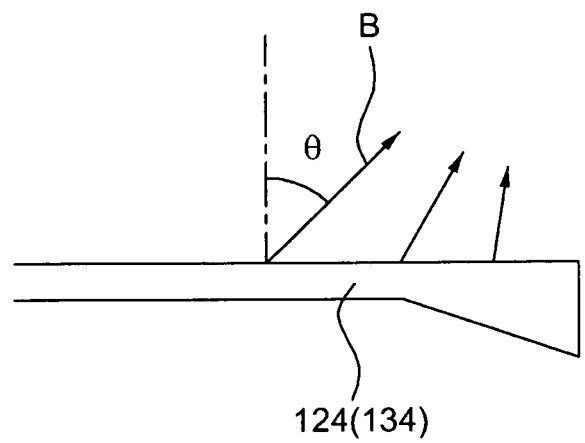
FIG. 7 is a conceptual diagram illustrating a property of beam convergence depending on a change of a thickness of a waveguide.

FIG. 5 is a conceptual diagram illustrating a radiation beam radiated from another end of a waveguide with an end connected to an ultrasonic wedge. FIG. 6 is a graph illustrating a dispersion property of phase velocity of a Lamb wave depending on a value obtained by multiplying a frequency of the Lamb wave and a thickness of a waveguide. FIG. 7 is a conceptual diagram illustrating a property of beam convergence depending on a change of a thickness of a waveguide.

A method of detecting a condition of an inside of a reactor vessel by first and second waveguide sensor units 120 and 130 is described. Hereinafter, the first waveguide sensor unit 120 is mainly described, since the first and second waveguide sensor units 120 and 130 detect the condition in a similar way.

When an ultrasonic signal with a particular frequency (f) is transmitted to a first waveguide 124 through a first ultrasonic wedge 122, the ultrasonic signal may be converted into a Lamb wave mode. The first waveguide 124 is formed in a plate. The Lamb wave is propagated in a lengthwise direction of the first waveguide 124 through the first waveguide 124, and may be emitted from another end of the first waveguide 124 to the inside of the reactor vessel. In this instance, the Lamb wave emitted to a liquid metal (L) in the reactor vessel may be converted into a longitudinal wave and propagated. Through this, as illustrated in FIG. 5, the radiation beam (B) may be radiated from the other end of the first waveguide 124 to the liquid metal (L). In this instance, the radiation beam (B) may be radiated with a predetermined radiation angle (θ).

In this instance, the Lamb wave has a dispersion property, that is, a phase velocity ($C_P$) of the Lamb wave changes depending on a thickness of the first waveguide 124 and an incident frequency. As illustrated in FIG. 6, a dispersion property of $0_{th}$ antisymmetric Lamb wave ($A_0$) is clearly shown in an range under 3 MHz·mm which is a value obtained by multiplying the incident frequency and the thickness of the first waveguide 124. Accordingly, a phase velocity ($C_P$) of the $0_{th}$ antisymmetric Lamb wave ($A_0$) may significantly change in the range depending on the value obtained by multiplying the incident frequency of the Lamb wave and the thickness of the first waveguide 124. Thus, when a value obtained by multiplying a thickness (d) of the first waveguide 124 and a frequency (f) of the Lamb wave increases in the range, the phase velocity ($C_P$) may increase. However, as illustrated in FIG. 6, when the value is greater than 3 MHz·mm, the phase velocity ($C_P$) does not significantly change when the value increases.

The radiation angle (θ) of the radiation beam (B) radiated from the other end of the first waveguide 124 may be determined based on a longitudinal wave velocity ($V_L$) of a liquid metal and the phase velocity ($C_P$) of the Lamb wave. That is, the radiation angle (θ) of the radiation beam (B) may be determined by, $$\sin\theta(fd) = \frac{V_L}{C_P(fd)} \qquad \text{[Equation 1]}$$

The phase velocity ($C_P$) may be represented as a function of the frequency (f) of the ultrasonic wave and the thickness (d) of the first waveguide 124. Accordingly, the radiation angle (θ) may be represented as the function of the frequency (f) of the ultrasonic wave and a thickness (d) of the first waveguide 124. Thus, when the frequency (f) of the ultrasonic wave or the thickness (d) of the first waveguide 124 changes, the radiation angle (θ) may change.

Also, a scan area detected by the first waveguide sensor unit 120 may increase without a mechanical operation, and a resolution of a C-Scan image may be improved.

Specifically, in the range under 3 MHz·mm, when the frequency (f) of the ultrasonic wave incident to a first ultrasonic wedge 122 changes, the phase velocity ($C_P$) may change although the thickness (d) of the first waveguide 124 does not change, as illustrated in FIG. 6. When the phase velocity ($C_P$) changes, the radiation angle (θ) of the radiation beam (B) may change based on Equation 1 although the first waveguide 124 is fixed on a predetermined location. Accordingly, the scan area detected by the first waveguide sensor unit 120 may change. Thus, the scan area detected by the first waveguide sensor unit 120 may increase without a mechanical operation.

Also, when a thickness of the other end of the first waveguide 124 increases in a lengthwise direction, the phase velocity ($C_P$) may increase when the frequency (f) of the ultrasonic wave does not change, as illustrated in FIG. 6. Also, when the phase velocity ($C_P$) increases, the radiation angle (θ) of the radiation beam (B) may decrease according to Equation 1. Accordingly, as illustrated in FIG. 7, the radiation beam (B) radiated from the other end of the first waveguide 124 may converge. When the above-described beam convergence is applied to a C-scan examination device, beam width is reduced due to the beam convergence, and thus a resolution of the C-Scan image may be improved.

According to an embodiment of the present invention, the dispersion and beam convergence properties may be selectively used. That is, when the area detected by the first waveguide sensor unit 120 is required to be extended, the detection area may increase using a high power ultrasonic pulser/receiver capable of changing a frequency of excitation pulse. Also, when an improvement of the resolution of the C-Scan image is required, the thickness of the end of the first waveguide 124 is to increase.

As described above, to change the radiation angle (θ) of the radiation beam (B) by changing the incident frequency or the thickness of the first waveguide 124, the value obtained by multiplying the incident frequency of the Lamb wave and the thickness of the first waveguide 124 is preferably under 3 MHz·mm, specifically, about 0.5 MHz·mm to 2.5 MHz·mm. For this, a longitudinal wave velocity of the first ultrasonic wedge 122 is preferably about 1300 m/s to 2000 m/s.

Since an general ultrasonic wedge is made of a polymer material such as Acrylic resin or methyl methacrylate, the $0_{th}$ antisymmetric Lamb wave ($A_0$) may not be generated in a range with a significant dispersion property (0.5 MHz·mm<fd<2.5 MHz·mm). Specifically, when the value obtained by multiplying the thickness (d) of the first waveguide 124 and the frequency (f) of the Lamb wave is about 0.5 MHz·mm to 2.5 MHz·mm, the phase velocity of the $0_{th}$ antisymmetric Lamb wave ($A_0$) may be less than 2700 m/s on average, as illustrated in FIG. 6. However, since a longitudinal wave velocity is generally about 2700 m/s in the general ultrasonic wedge, the general ultrasonic wedge may not generate the $0_{th}$ antisymmetric Lamb wave ($A_0$) in the range of the significant dispersion property (0.5 MHz·mm<fd<2.5 MHz·mm).

Accordingly, the longitudinal wave velocity of the first ultrasonic wedge 122 is preferably about 1300 m/s to 2000 m/s to generate the $0_{th}$ antisymmetric Lamb wave ($A_0$) in the range of the significant dispersion property (0.5 MHz·mm<fd<2.5 MHz·mm). For this, the first ultrasonic wedge 122 may be made of polymer polytetrafluoroethylene (Teflon®). A longitudinal wave velocity of the polymer Teflon® wedge is generally about 1340 m/s. Also, the first ultrasonic wedge 122 may be a liquid wedge filled with water or glycerin. A longitudinal wave velocity of a liquid wedge filled with water may be generally about 1480 m/s, and a longitudinal wave velocity of a liquid wedge filled with glycerin may be generally about 1920 m/s.

The radiation beam (B) radiated as described may be reflected from an object in the reactor vessel. A reflection signal may be converted into a Lamb wave again, and received in the first waveguide 124. The reflection signal may be detected by a first ultrasonic sensor 126, and the detected reflection signal is analyzed. Accordingly, a condition of a bottom of an extraction unit 112 may be detected.

Figure 8:
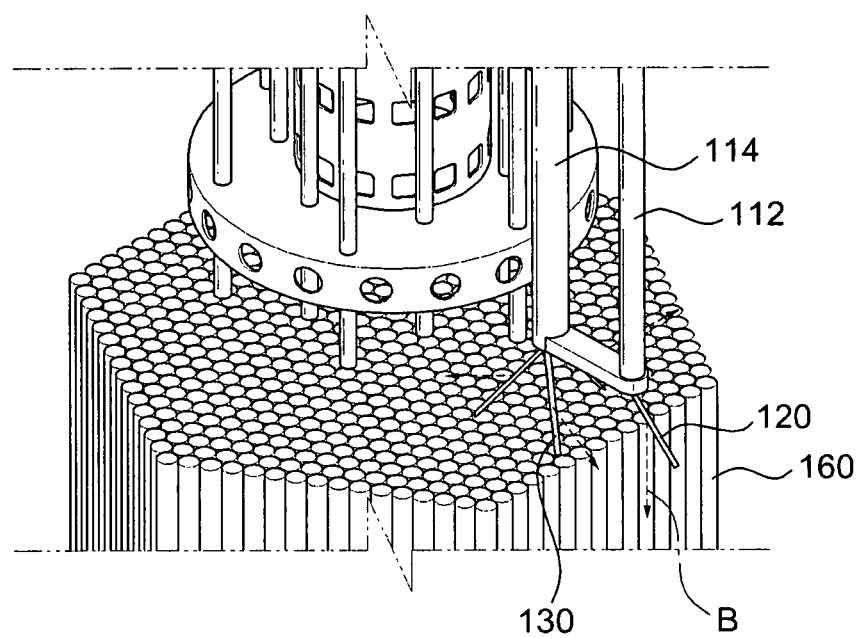
FIGS. 8 and 9 are conceptual diagrams illustrating a method of detecting an inside of a reactor vessel by a refueling apparatus according to an exemplary embodiment of the present invention.
Figure 9:
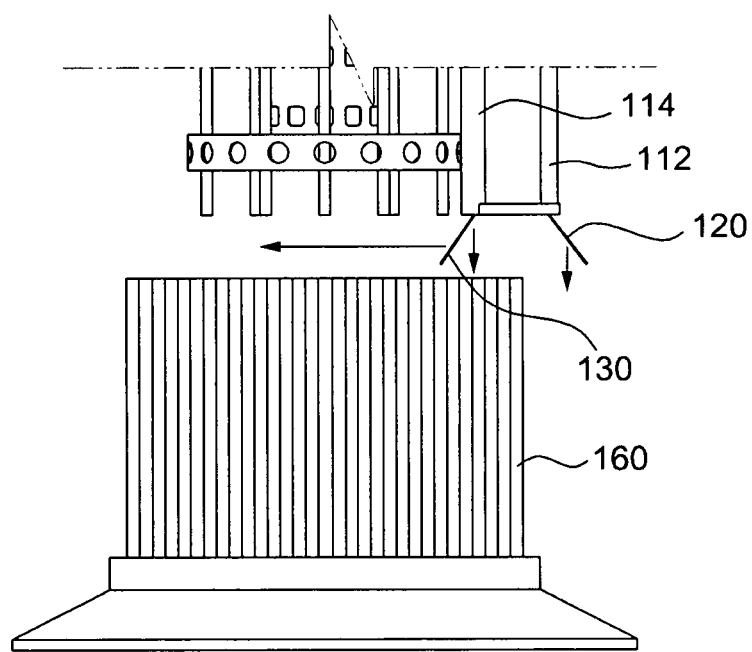

FIGS. 8 and 9 are conceptual diagrams illustrating a method of detecting an inside of a reactor vessel by a refueling apparatus according to an exemplary embodiment of the present invention.

According to an embodiment of the present invention, the refueling apparatus may include a refueling unit 110, first waveguide sensor unit 120, and second waveguide sensor unit 130. As illustrated in FIGS. 8 and 9, the refueling apparatus may refuel the reactor vessel while detecting a condition of the inside of the reactor vessel along a direction of the refueling unit. The first waveguide sensor unit may detect a condition of a bottom of an extraction unit along the direction of the refueling unit, and a second waveguide sensor unit may detect a condition of a side of a central axis. Accordingly, the detection of the inside of the reactor vessel and the refueling process may be simultaneously performed.

According to another embodiment of the present invention, a refueling method may include an operation of generating an ultrasonic signal, an operation of transmitting the ultrasonic signal to an ultrasonic wedge and forming a Lamb wave, an operation of transmitting the Lamb wave into the reactor vessel from another end of a waveguide, an operation of sensing a reflection signal reflected from an inside of the reactor vessel through an ultrasonic sensor connected to the ultrasonic wedge, an operation of detecting a condition of the inside of the reactor vessel using the reflection signal, and an operation of refueling the reactor vessel through a refueling unit loading new nuclear fuel to a core or extracting spent nuclear fuel from the core. In this instance, the waveguide has an end connected to the ultrasonic wedge and is formed in a plate shape. Detailed descriptions that have been provided above are omitted.

In general, an ultrasonic signal may be generated by the high power ultrasonic pulser/receiver which is not illustrated. The ultrasonic pulser/receiver may generate the ultrasonic signal by adjusting a frequency of excitation wave pulse. Also, the ultrasonic pulser/receiver may collect an analog signal generated by an ultrasonic sensor, which is described in detail.

When the generated ultrasonic signal is transmitted to a waveguide through an ultrasonic wedge, the ultrasonic signal may be converted into a Lamb wave mode. The waveguide is formed in a plate shape. The Lamb wave may be propagated along the waveguide in a lengthwise direction of the waveguide, and emitted to an inside of the reactor vessel from the other end of the waveguide. The Lamb wave emitted to a liquid metal in the reactor vessel may be converted into a longitudinal wave mode, and propagated. A reflection signal reflected from an object in the reactor vessel is converted into the Lamb wave again, and received in the waveguide. The reflection signal may be detected by an ultrasonic sensor.

The ultrasonic sensor may generate an analog signal based on the detected reflection signal. The analog signal generated in the ultrasonic sensor may be collected by an ultrasonic pulser/receiver. The analog signal collected in the ultrasonic pulser/receiver may be viewed with an oscilloscope. Also, the analog signal collected in the ultrasonic pulser/receiver is converted into a digital signal through an Analog to Digital (A/D) converter, and thus the reflection signal may be analyzed by a computer. The computer may display an ultrasonic image associated with the inside of the reactor vessel based on a result of the analysis. Through this, a condition of the inside of the reactor vessel may be detected.

The waveguide may integrally move with the refueling unit. The refueling unit may load the new nuclear fuel to the core or extract the spent nuclear fuel from the core. Accordingly, the refueling apparatus may refuel the fuel assembly in the reactor vessel while detecting a condition of the inside of the reactor vessel.

A radiation angle of a radiation beam, radiated from the other end of the waveguide, may change depending on a frequency change of an ultrasonic signal incident to the ultrasonic wedge. The ultrasonic wedge is made of a material with a longitudinal wave velocity of about 1300 m/s to 2000 m/s, and thus a value obtained by multiplying an incident frequency of the Lamb wave and a thickness of the waveguide may be about 0.5 MHz·mm to 2.5 MHz·mm.

According to the present invention, there is provided a refueling apparatus which includes a refueling unit and a waveguide sensor unit integrally formed with the refueling unit, without a core examination device and an ultrasonic examination apparatus to be separately mounted in a reactor vessel, and thereby may simplify the in-vessel component in the reactor vessel and a refueling process.

According to the present invention, there is provided a refueling apparatus which detects a condition of an inside of a reactor vessel such as a location of a fuel assembly and whether an obstacle exists on a transfer path of nuclear fuel assembly using an ultrasonic signal, and thereby may improve safe handling of the fuel assembly.

According to the present invention, there is provided a refueling apparatus which includes a waveguide sensor unit which is integrally formed with the refueling apparatus and remotely transmits an ultrasonic wave into a reactor vessel, and thus an ultrasonic sensor is mounted outside the reactor vessel and a life of the ultrasonic sensor may increase.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A refueling apparatus for charging a nuclear fuel assembly in a reactor vessel, the refueling apparatus comprising:
    a refueling unit for loading new nuclear fuel to a reactor core or extracting spent nuclear fuel from the core; and
    a waveguide sensor unit including an ultrasonic wedge configured to form a Lamb wave, a waveguide with a first end connected to the ultrasonic wedge and with a second end configured to transmit the Lamb wave into liquid metal in the reactor vessel, and an ultrasonic sensor connected to the ultrasonic wedge and configured to sense a reflection signal reflected from an inside of the reactor vessel, the waveguide being formed in a plate shape and mounted in an end of the refueling unit,
    wherein the waveguide integrally moves with the refueling unit, and the waveguide sensor unit is configured to detect a condition of the inside of the reactor vessel, while the refueling unit refuels the fuel assembly in the reactor vessel, and
    wherein the refueling unit has a space for the waveguide, and at least a portion of the waveguide is mounted in the refueling unit.

2. The refueling apparatus of claim 1, wherein the waveguide sensor unit is configured to change a radiation angle of a radiation beam depending on a frequency change of an ultrasonic signal incident to the ultrasonic wedge, the radiation beam being radiated from the second end of the waveguide.

3. The refueling apparatus of claim 1, wherein a thickness of the second end of the waveguide transmitting the Lamb wave increases in a lengthwise direction.

4. The refueling apparatus of claim 1, wherein the ultrasonic wedge is made of a material capable of propagating a longitudinal wave velocity of about 1300 m/s to 2000 m/s, and configured to generate an $A_0$ antisymmetric Lamb wave of an range of 0.5 MHz·mm to 2.5 MHz·mm which is a value obtained by multiplying an incident frequency of the Lamb wave and a thickness of the waveguide.

5. The refueling apparatus of claim 1, wherein the ultrasonic wedge is made of a polymer polytetrafluoroethylene wedge and filled with water or glycerin capable of propagating a longitudinal wave velocity of about 1300 m/s to 2000 m/s.

6. A refueling apparatus for charging a nuclear fuel assembly in a reactor vessel, the refueling apparatus comprising:
    a refueling unit including an extraction unit for extracting the nuclear fuel and a central axis connected to the extraction unit and transferring the extraction unit;
    a first waveguide sensor unit including a first ultrasonic wedge configured to form a Lamb wave, a first waveguide with a first end connected to the first ultrasonic wedge and with a second end configured to transmit the Lamb wave to a bottom of the extraction unit, and a first ultrasonic sensor connected to the first ultrasonic wedge and configured to sense a reflection signal reflected from an inside of the reactor vessel, the first waveguide being formed in a plate shape and mounted in an end of the extraction unit; and
    a second waveguide sensor unit including a second ultrasonic wedge configured to form a Lamb wave, a second waveguide with a third end connected to the second ultrasonic wedge and with a fourth end configured to transmit the Lamb wave to a side of the central axis, and a second ultrasonic sensor connected to the second ultrasonic wedge and configured to sense a reflection signal reflected from an inside of the reactor vessel, the second waveguide being formed in a plate shape and mounted in an end of the central axis,
    wherein the first waveguide sensor unit is configured to detect a condition of a bottom of the extraction unit and the second waveguide sensor unit is configured to detect a condition of the side of the central axis while the refueling unit refuels the reactor vessel, and
    wherein the extraction unit has a first space for the first waveguide, and at least a portion of the first waveguide is mounted in the extraction unit, and the central axis has a second space for the second waveguide, and at least a portion of the second waveguide is mounted in the central axis.

7. The refueling apparatus of claim 6, wherein the first and second waveguide sensor units are configured to change a radiation angle of a radiation beam depending on a frequency change of an ultrasonic signal incident to the first and second ultrasonic wedges, and the second waveguide sensor unit includes a plurality of waveguide sensor units, the radiation beam being radiated from the second end of the first waveguide and the fourth end of the second waveguide.

8. The refueling apparatus of claim 6, wherein the second and fourth ends have a respective thickness increasing in a lengthwise direction.

* * * * *